US012574693B2

(12) United States Patent
Bhowmik et al.

(10) Patent No.: US 12,574,693 B2
(45) Date of Patent: Mar. 10, 2026

(54) PERSON-TO-PERSON VOICE COMMUNICATION VIA EAR-WEARABLE DEVICES

(71) Applicant: Starkey Laboratories, Inc., Eden Prairie, MN (US)

(72) Inventors: Achintya Kumar Bhowmik, Cupertino, CA (US); William F. Austin, Eden Prairie, MN (US); Madj Srour, San Jose, CA (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 227 days.

(21) Appl. No.: 18/064,102

(22) Filed: Dec. 9, 2022

(65) Prior Publication Data

US 2023/0188907 A1 Jun. 15, 2023

Related U.S. Application Data

(60) Provisional application No. 63/265,255, filed on Dec. 10, 2021.

(51) Int. Cl.
*H04R 25/00* (2006.01)

(52) U.S. Cl.
CPC ....... *H04R 25/554* (2013.01); *H04R 2225/55* (2013.01)

(58) Field of Classification Search
CPC .......................... H04R 25/554; H04R 2225/55
See application file for complete search history.

(56) References Cited

U.S. PATENT DOCUMENTS 8,027,638 B2 9/2011 Sanguino et al.
9,774,961 B2 9/2017 Solum et al.
(Continued)

FOREIGN PATENT DOCUMENTS

EP 2153692 12/2010
EP 2884726 6/2015
(Continued)

OTHER PUBLICATIONS

"European Application Serial No. 22212639.3, Extended European Search Report mailed Aug. 23, 2023", 15 pgs.
(Continued)

*Primary Examiner* — Mark Fischer
(74) *Attorney, Agent, or Firm* — Schwegman Lundberg & Woessner, P.A.

(57) ABSTRACT

Disclosed herein, among other things, are systems and methods for person-to-person voice communication between ear-wearable devices. A method includes receiving, using a microphone of a first hearing device configured to be worn on or in an ear of the first user, a first acoustic own voice signal from the first user. The method further includes transmitting, from the first hearing device via a wireless connection to a second hearing device configured to be worn on or in an ear of a second user, a first audio packet based on the received first acoustic own voice signal. The method also includes receiving, at the second hearing device via the wireless connection, the first audio packet from the first hearing device, and playing, at the second hearing device using a second receiver, an output signal for the second user based on the first audio packet.

20 Claims, 5 Drawing Sheets

(56) References Cited

U.S. PATENT DOCUMENTS

| | | | | |
|---|---|---|---|---|
| 9,848,457 | B1* | 12/2017 | Yae | H04W 76/14 |
| 10,321,244 | B2 | 6/2019 | Solum | |
| 10,764,694 | B2 | 9/2020 | Solum | |
| 2005/0195996 | A1 | 9/2005 | Dunn et al. | |
| 2010/0150383 | A1 | 6/2010 | Sampat | |
| 2010/0303014 | A1 | 12/2010 | McMullin et al. | |
| 2016/0105751 | A1* | 4/2016 | Zurbruegg | H04R 25/505<br>381/317 |
| 2016/0360326 | A1* | 12/2016 | Bergmann | H04R 25/43 |
| 2017/0048613 | A1* | 2/2017 | Smus | H04L 65/1069 |
| 2017/0171673 | A1 | 6/2017 | Solum | |
| 2018/0109889 | A1 | 4/2018 | Kang et al. | |
| 2020/0044323 | A1* | 2/2020 | Oesch | H01Q 7/00 |
| 2020/0245938 | A1 | 8/2020 | Xu et al. | |
| 2021/0219065 | A1* | 7/2021 | El-Hoiydi | H04L 47/2416 |
| 2022/0132252 | A1* | 4/2022 | Pedersen | H04R 1/1083 |
| 2022/0337964 | A1* | 10/2022 | Feilner | H04R 25/554 |

FOREIGN PATENT DOCUMENTS

| | | | |
|---|---|---|---|
| EP | 3849215 | A1 | 7/2021 |
| EP | 3873110 | | 9/2021 |
| WO | 2014161091 | | 10/2014 |
| WO | 2014166525 | | 10/2014 |
| WO | 2019233588 | | 12/2019 |
| WO | 2020262926 | | 12/2020 |

OTHER PUBLICATIONS

"European Application Serial No. 22212639.3, Communication Pursuant to Article 94(3) EPC mailed Jul. 17, 2025", 11 pgs.

Gans, Niccolo, "Binaural Noise Reduction in Hearing Aid Simulations Using a Multichannel Wiener Filter", 2019 International Symposium on Multimedia and Communication Technology (ISMAC), IEEE, DOI: 10.1109 ISMAC.2019.8836180[retrieved on Sep. 12, 2019], (Aug. 19, 2019), 5 pgs.

* cited by examiner

PERSON-TO-PERSON VOICE COMMUNICATION VIA EAR-WEARABLE DEVICES

CLAIM OF PRIORITY AND INCORPORATION BY REFERENCE

The present application claims the benefit under 35 U.S.C. § 119(e) of U.S. Provisional Patent Application 63/265,255, filed Dec. 10, 2021, the disclosure of which is hereby incorporated by reference herein in its entirety.

TECHNICAL FIELD

This document relates generally to audio device systems and more particularly to systems and methods for wireless communication between users of ear-wearable devices.

BACKGROUND

Audio devices can be used to provide audible output to a user based on received wireless signals. Examples of audio devices include speakers and ear-wearable devices, also referred to herein as hearing devices. Example of hearing devices include hearing assistance devices or hearing instruments, including both prescriptive devices and non-prescriptive devices. Specific examples of hearing devices include, but are not limited to, hearing aids, headphones, and earbuds.

Hearing devices generally include the capability to receive audio streams from a variety of sources. For example, a hearing device may receive audio or data wirelessly from a transmitter or streamer of an assistive listening device (ALD) or smartphone. Audio information can be digitized, packetized and transferred as digital packets to the hearing devices for the purpose of streaming entertainment or other content. However, streaming audio from a hearing device is problematic due to latency issues and traditionally involves the use of an external device for controlling communications.

Thus, there is a need in the art for improved systems and methods for transmitting and receiving an audio stream for hearing devices.

SUMMARY

Disclosed herein, among other things, are systems and methods for wireless communication between ear-wearable devices. A method includes receiving, using a microphone of a first hearing device configured to be worn on or in an ear of the first user, a first acoustic own voice signal from the first user. The method further includes transmitting, from the first hearing device via a wireless connection to a second hearing device configured to be worn on or in an ear of a second user, a first audio packet based on the received first acoustic own voice signal. The method also includes receiving, at the second hearing device via the wireless connection, the first audio packet from the first hearing device, and playing, at the second hearing device using a second receiver, a second output signal for the second user based on the first audio packet.

Various aspects of the present subject matter include a system including one or more first hearing devices configured to be worn on or in an ear of a first user, and one or more second hearing devices configured to be worn on or in an ear of a second user. The one or more first hearing devices include one or more first processors programmed to receive a first acoustic own voice signal from the first user using a first microphone, transmit to the one or more second hearing devices via a wireless connection a first audio packet based on the received first acoustic own voice signal, receive a second audio packet from the one or more second hearing devices via the wireless connection, and play a first output signal for the first user based on the second audio packet. The one or more second hearing devices include one or more second processors programmed to receive a second acoustic own voice signal from the second user using a second microphone, transmit to the one or more first hearing devices via the wireless connection the second audio packet based on the received second acoustic own voice signal, receive the first audio packet from the one or more first hearing devices via the wireless connection, and play a second output signal for the second user based on the first audio packet.

This Summary is an overview of some of the teachings of the present application and not intended to be an exclusive or exhaustive treatment of the present subject matter. Further details about the present subject matter are found in the detailed description and appended claims.

BRIEF DESCRIPTION OF THE DRAWINGS

Various embodiments are illustrated by way of example in the figures of the accompanying drawings. Such embodiments are demonstrative and not intended to be exhaustive or exclusive embodiments of the present subject matter.

DETAILED DESCRIPTION

Figure 1A:
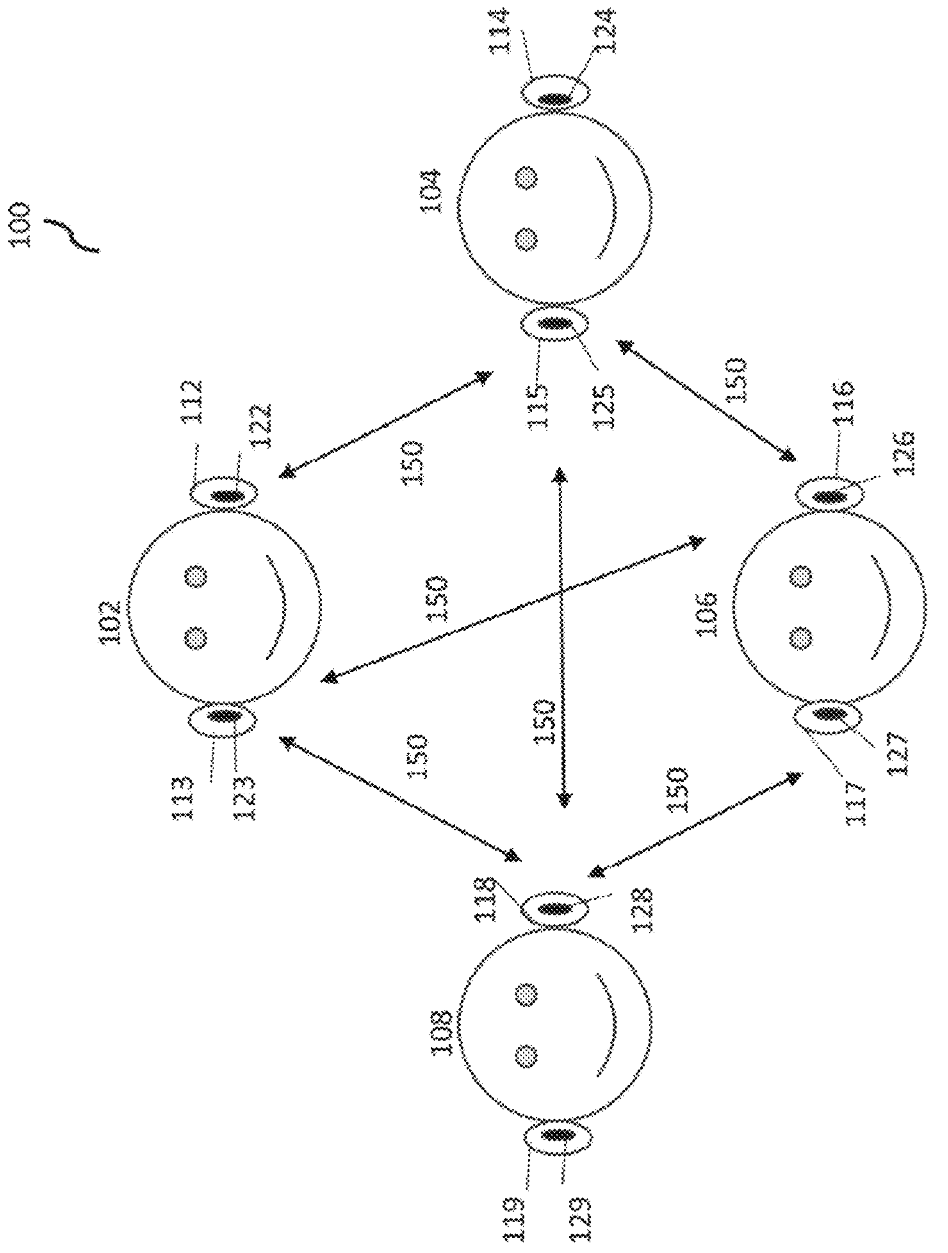
FIG. 1A illustrates a block diagram of a system for person-to-person voice communication via ear-wearable devices, according to various embodiments of the present subject matter.

The following detailed description of the present subject matter refers to subject matter in the accompanying drawings which show, by way of illustration, specific aspects and embodiments in which the present subject matter may be practiced. These embodiments are described in sufficient detail to enable those skilled in the art to practice the present subject matter. References to "an", "one", or "various" embodiments in this disclosure are not necessarily to the same embodiment, and such references contemplate more than one embodiment, including combinations of such embodiments. The following detailed description is demonstrative and not to be taken in a limiting sense. The scope of the present subject matter is defined by the appended claims, along with the full scope of legal equivalents to which such claims are entitled.

The present detailed description will discuss audio devices such as hearing devices and speakers. The description refers to hearing devices generally, which include earbuds, headsets, headphones and hearing assistance devices using the example of hearing aids. Other hearing devices include, but are not limited to, those in this document. It is understood that their use in the description is intended to demonstrate the present subject matter, but not in a limited or exclusive or exhaustive sense.

Hearing devices generally include the capability to receive audio streams from a variety of sources. For example, a hearing device may receive audio or data wirelessly from a transmitter or streamer of an assistive listening device (ALD) or smartphone. Audio information can be digitized, packetized and transferred as digital packets to the hearing devices for the purpose of streaming entertainment or other content. However, streaming audio from a hearing device is problematic due to latency issues and traditionally involves the use of an external device for controlling communications.

The present subject matter provides systems and methods for person-to-person voice communication via bidirectional audio streaming for users of ear-wearable hearing devices. The present subject matter uses a wireless connection between ear-wearable devices of separate users, and audio signal processing technology, to enable fluid participation and understanding of conversations between the separate users. Thus, users of ear-wearable devices can experience a "walkie-talkie" mode of conversation through wireless streaming between ear-wearable devices of multiple users without the need for an intermediate or accessory device, reducing latency and providing for improved speech understanding between participating users.

In various examples, the present system provides a user interface to control the bidirectional communication feature, such as a button press on the ear-wearable device, a mobile application control, a voice control, or any combination thereof, that may be used to pair and unpair devices. In one example, a button press on a smartphone application in communication with the ear wearable device may send a request for permission to the other user's phone, or directly to the other user's ear wearable device, or both, to initiate pairing of the devices. In various examples, a user may select another user or users for bidirectional communication from an interface of the smartphone application. In some examples, a button on the ear-wearable device is programmed during fitting to be used to initiate or control bidirectional communication with other users. In one example, the other users receive a notification that the user is initiating a bidirectional streaming session, and the other users may accept or reject the request using one or more or the user interfaces available to the other users (e.g., a button press on the ear-wearable device, a mobile application control, or a voice control). Additionally or alternatively, the user interface may be used to turn an audio stream on or off, or to control parameters relating to wireless streaming. A single user may control parameters for all users in a streaming session, or each user may control their own parameters, or some combination thereof, in various examples. Additionally or alternatively, the present system may integrate audio signal processing features of the ear wearable device, such as own-voice detection, echo cancellation, and/or feedback cancellation, such as by using own-voice detection as gate for initiating the bidirectional audio streaming.

Additionally or alternatively, the present system may suppress ambient noise during bidirectional streaming, e.g., to enable the person to better hear the other conversant. Optionally, the present system may mix multiple wireless streams (e.g., conversation from one other user with conversation of additional other users and/or with streamed television (TV) or music). The present system may integrate user preferences to suppress (e.g., reduce volume) of an existing audio stream to the user when receiving speech/sound from the other person via bidirectional audio streaming, in various examples. According to one example, the present system may use machine learning to detect speech and suppress non-speech sounds (e.g., suppressing a cough or sneeze).

The person-to-person voice communication via bidirectional audio streaming for users of ear-wearable hearing devices of the present subject matter provides for latency reduction by eliminating the use of intermediate devices. Further latency reduction is provided by the present subject matter by providing for recognition that a wireless connection to another user's ear wearable device is a prioritized connection (or prioritized stream). In addition, the present subject matter may prioritize low latency over bandwidth, since the bidirectional connection to another user is maintained for the purposes of voice communication, or speech, which does not require the broad bandwidth used for other types of streaming (e.g., music). This reduced latency enhances conversational quality and user experience, in various examples.

Optionally, the present subject matter provides for collaborative noise cancelling. For example, when two users of separate pairs of ear-wearable devices (e.g., husband and wife devices) are connected according to the present methods, the devices may share information (e.g., ambient noise characterization or directionality) to enhance performance of hearing device features (e.g., increase intelligibility or reduce noise).

In various examples, a single device of a first user (left hearing device of first user) may communication via bidirectional streaming with a single device of a second user (left hearing device of second user). In this example, the left devices may relay communication to the respective right devices for one or both users. In some examples, both devices of all users participate in the connection. In various examples, communication between users may be switched from left devices to right devices for one or both (or multiple) users based on a number of factors. For example, a user that is communicating using his or her left ear-wearable device may automatically switch to communicating using his or her right ear-wearable device (or vice versa) for load balancing, to prevent battery depletion for a single device. In another example, a user that is communicating using his or her left ear-wearable device may automatically switch to communicating using his or her right ear-wearable device (or vice versa) based on a signal strength comparison, to provide the strongest signal possible between the users. Specifically, an ear-wearable device of the present system may monitor communications with the other user and use signal strength to determine which device (left, right) to use for wireless coupling, to avoid interference caused by a user's head, in one example. Additionally or alternatively, the present system may apply one or more criteria (e.g., a signal strength threshold) and check with the other ear-wearable device of the user if the criteria is not satisfied (e.g., signal strength falls below a threshold) to ascertain whether it would be advantageous to switch to the other ear-wearable device of the user for bidirectional streaming with other users. The present subject matter may use streaming to both left and right ears directly (e.g., eavesdropping), or may use a relay technique (e.g., near-field communication relay between left and right on a person's head) for the person-to-person communication, in various examples.

In some examples, the present subject matter provides for three dimensional (3-D) localization and direction of arrival processing for received streaming from ear wearable devices of other users. In one example, the present system may compare the arrival of wireless signals from the other user using both left and right ear-wearable devices to assist in a directionality determination (e.g., to determine where the other user is spatially from the present user). In various examples, the system may recreate queues in audio, such as by applying a directionality algorithm such that the sound appears to come from the direction of the speaker with the other set of paired ear-wearable devices.

Various examples of the present subject matter use own voice detection of the ear-wearable device, and cancel out other ambient noise (e.g., background noise) using binaural noise reduction before streaming the voice signals via a wireless connection to the other user's ear-wearable device. Additionally or alternatively, the present system provides for multiple modes of bidirectional streaming communication, including for example a mode that allows a user to continue to hear ambient sounds as well as incoming streaming of voice communications from the other user or users.

FIG. 1A illustrates a block diagram of a system for person-to-person voice communication via ear-wearable devices, according to various embodiments of the present subject matter. The system 100 includes one or more first hearing devices 122, 123 configured to be worn on or in an ear 112, 113 of a first user 102, and one or more second hearing devices 124, 125 configured to be worn on or in an ear 114, 115 of a second user 104. The one or more first hearing devices 122, 123 include one or more first processors programmed to receive a first acoustic own voice signal from the first user using a first microphone, transmit to the one or more second hearing devices 124, 125 via a wireless connection 150 a first audio packet based on the received first acoustic own voice signal, receive a second audio packet from the one or more second hearing devices 124, 125 via the wireless connection 150, and play a first output signal for the first user based on the second audio packet. The one or more second hearing devices 124, 125 include one or more second processors programmed to receive a second acoustic own voice signal from the second user using a second microphone, transmit to the one or more first hearing devices 122, 123 via the wireless connection 150 the second audio packet based on the received second acoustic own voice signal, receive the first audio packet from the one or more first hearing devices 122, 123 via the wireless connection 150, and play a second output signal for the second user based on the first audio packet.

Additionally or alternatively, more than two users are present in the system and may communicate simultaneously, nearly simultaneously, or sequentially, using the methods of the present subject matter. For example, the system may include one or more third hearing devices 126, 127 configured to be worn on or in an ear 116, 117 of a third user 106, and one or more fourth hearing devices 128, 129 configured to be worn on or in an ear 118, 119 of a fourth user 108. Other numbers of users can participate in the communication of the present system without departing from the scope of the present subject matter. Various types of wireless connections may be used, including but not limited Bluetooth® (such as Bluetooth® 5.2, for example) or Bluetooth® Low Energy (BLE) connections. In various examples, the wireless connection provides for use of isochronous channels. For example, Bluetooth® 5.2 permits one device to stream to multiple devices over isochronous channels.

Additionally or alternatively, the present subject matter may provide for person-to-group voice communication (e.g., secured broadcasting). In an example, a user of a hearing device may be within a tourist group and a guide is speaking to the group, and a broadcast is used from the guide to all users that have hearing devices. For example, the hearing devices may use BLE 5.2 to receive the communications. The person-to-group voice communication may be used with devices such as noise cancelling headphones or other ear buds.

In some examples, the present subject matter may use a vibration sensor to sense a user's own voice signal for person-to-person or person-to-group communications. In other examples, the present subject matter may use an inner microphone of the hearing device to sense a user's own voice signal for person-to-person or person-to-group communications. The inner microphone may be directed into an ear canal of the user and provide a better signal. The system may leverage machine learning for own voice identification, in some examples.

Additionally or alternatively, the present system may provide for a quick pairing between two hearing device users for person-to-person communications. For example, if the hearing devices include an inertial measurement unit (IMU), the present system may sense head rotation of a user to determine the user has turned to look at a second user, and then automatically pair a device of the first user to a device of the second user. In some examples, the system may use the IMU to limit streaming of voice from a first user to a second user only when the first user is looking at the second user, based on head position of the first user. The present system may use directional or omnidirectional microphones, in various examples.

Figure 1B:
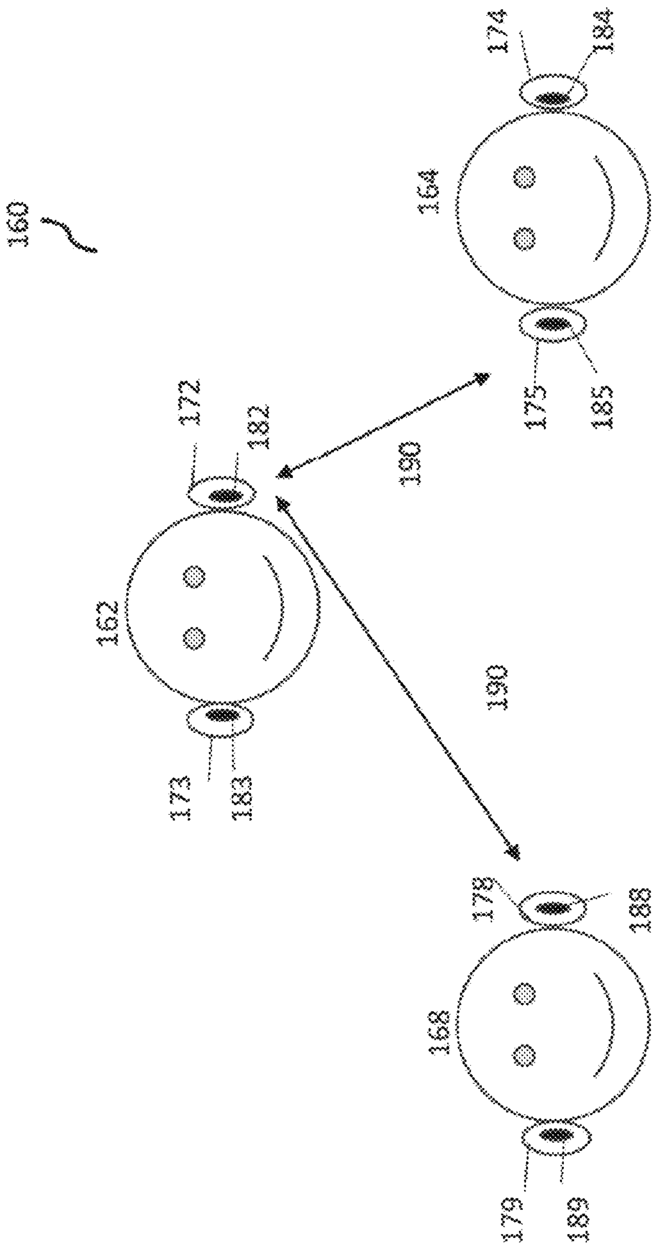
FIG. 1B illustrates a block diagram of a system for person-to-person relaying of voice communication via ear-wearable devices, according to various embodiments of the present subject matter.

FIG. 1B illustrates a block diagram of a system for person-to-person relaying of voice communication via ear-wearable devices, according to various embodiments of the present subject matter. In various examples, the system may use wireless communication (such as BLE) between hearing devices of users to relay voice communications. For example, if two distant workers on a construction site or pipeline are at a distance beyond which direct wireless communication and/or direct voice communication is feasible, the respective devices (such as sound cancelling headphones, earbuds, hearing aids, or the like) of the users may determine a third user is between them and use a device (such as sound cancelling headphones, earbuds, hearing aids, or the like) of the third user as a proxy to relay communications. In FIG. 1B, the system 160 optionally includes one or more first hearing devices 188, 189 configured to be worn on or in an ear 178, 179 of a first user 168, one or more second hearing devices 184, 185 configured to be worn on or in an ear 174, 175 of a second user 164, and one or more third hearing devices 182, 183 configured to be worn on or in an ear 172, 173 of a third user 162. In one example, the first user 168 attempts to talk to the second user 164 that is outside or range of wireless or voice communication, and the system uses a device 182 of the third user 162 to relay communications 190 between a device 188 the first user 168 and a device 185 the second user 164.

Additionally or alternatively, at least one of the hearing devices includes a control button on a surface of a device housing. The control button is configured to be pressed to pair or unpair the hearing devices, in some examples. In various examples, at least one of the hearing devices includes a connection to a smartphone application. The smartphone application is configured to be used to pair or unpair the hearing devices, in some examples. In some examples, at least one of the hearing devices includes a voice control configured to be used to pair or unpair the hearing devices. In some examples, the one or more first hearing devices and the one or more second hearing devices are configured to share audio information to enhance performance of one or more of speech intelligibility or noise reduction. In various examples, at least one of the hearing devices is a hearing assistance device, such as a hearing aid.

Figure 2:
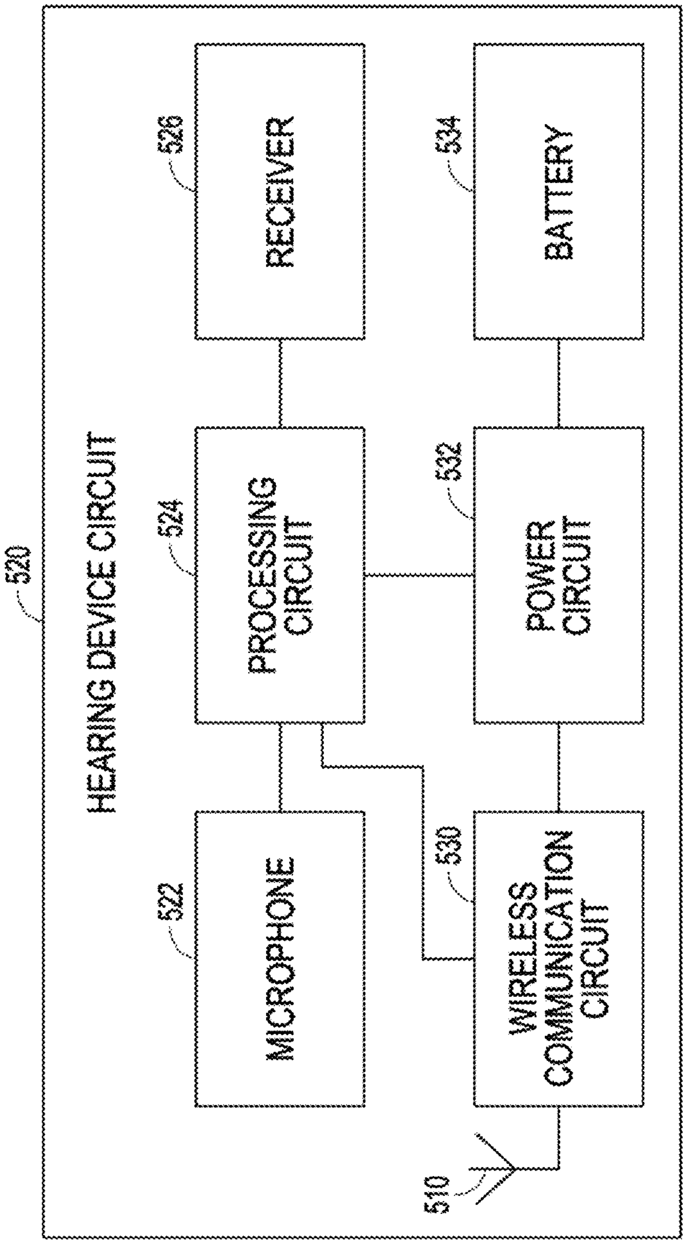
FIG. 2 illustrates a block diagram of a hearing device circuit, according to various embodiments of the present subject matter.

FIG. 2 illustrates a block diagram of a hearing device circuit, according to various embodiments of the present subject matter. Hearing device circuit 520 represents an example of portions of a hearing device 310 and includes a microphone 522, a wireless communication circuit 530, an antenna 510, a processing circuit 524, a receiver (speaker) 526, a battery 534, and a power circuit 532. Microphone 522 receives sounds from the environment of the hearing device user (wearer of the hearing device). Wireless communication circuit 530 communicates with another device wirelessly using antenna 510, including receiving programming codes, streamed audio signals, and/or other audio signals and transmitting programming codes, audio signals, and/or other signals. Examples of the other device includes other hearing devices of other users, another hearing device of a pair of hearing devices for the same wearer, a hearing device host device, an ALD, an audio streaming device, a smartphone, and other devices capable of communicating with hearing devices wirelessly. Processing circuit 524 controls the operation of hearing device 310 using the programming codes and processes the sounds received by microphone 522 and/or the audio signals received by wireless communication circuit 530 to produce output sounds. Receiver 526 transmits output sounds to an ear canal of the hearing device wearer. Battery 534 and power circuit 532 constitute the power source for the operation of hearing device circuit 520. In one example, power circuit 532 can include a power management circuit. In another alternative or additional example, battery 534 can include a rechargeable battery, and power circuit 532 can include a recharging circuit for recharging the rechargeable battery.

Figure 3:
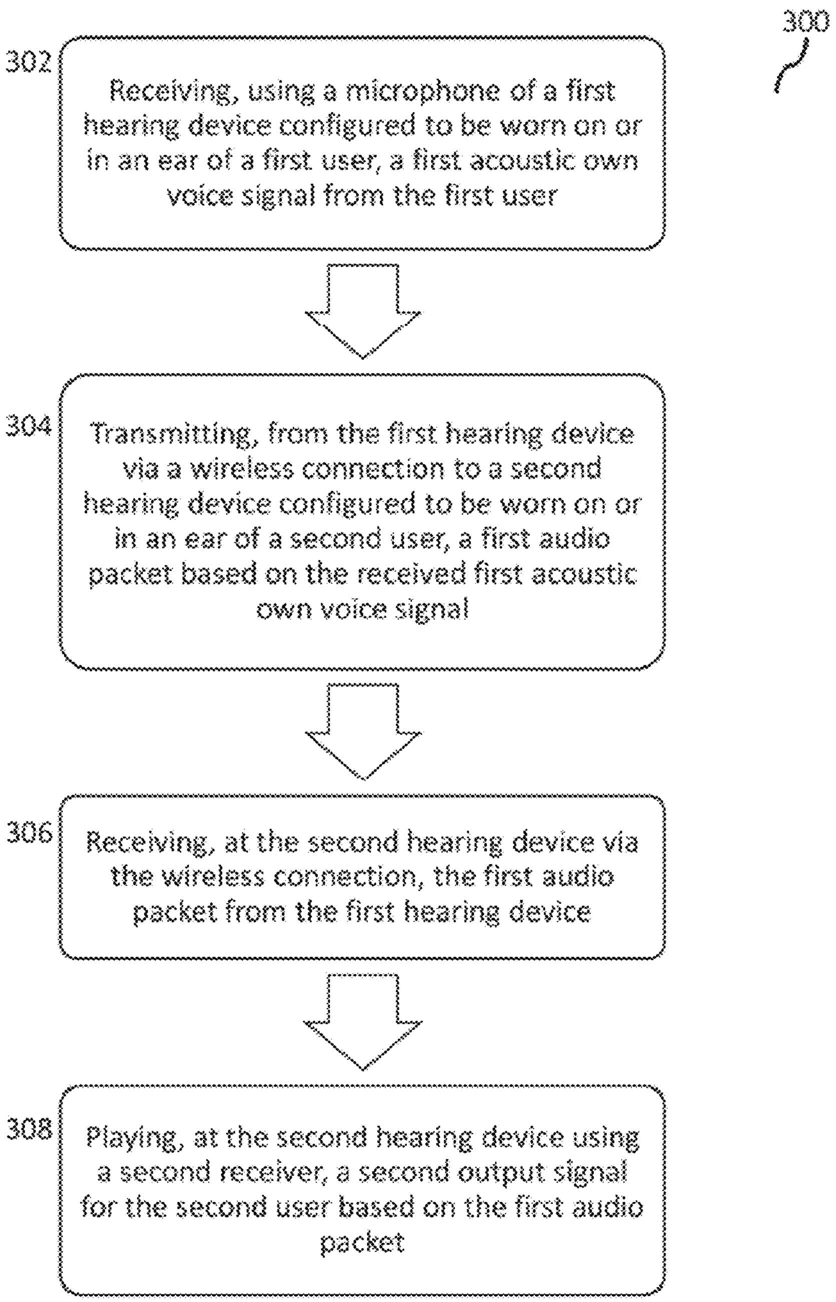
FIG. 3 illustrates a flow diagram of a method for wireless communication between users of ear-wearable devices, according to various embodiments of the present subject matter.

FIG. 3 illustrates a flow diagram of a method for wireless communication between ear-wearable devices, according to various embodiments of the present subject matter. The method 300 includes receiving, using a microphone of a first hearing device configured to be worn on or in an ear of the first user, a first acoustic own voice signal from the first user, at step 302. At step 304, the method further includes transmitting, from the first hearing device via a wireless connection to a second hearing device configured to be worn on or in an ear of a second user, a first audio packet based on the received first acoustic own voice signal. The method also includes receiving, at the second hearing device via the wireless connection, the first audio packet from the first hearing device, at step 306. At step 308, the method includes playing, at the second hearing device using a second receiver, a second output signal for the second user based on the first audio packet.

The method further includes receiving, using a second microphone of the second hearing device, a second acoustic own voice signal from the second user, and transmitting, from the second hearing device via the wireless connection to the first hearing device, a second audio packet based on the received second acoustic own voice signal. The method also includes receiving, at the first hearing device via the wireless connection, the second audio packet from the second hearing device, and playing, at the first hearing device using a first receiver, a first output signal for the first user based on the second audio packet.

Additionally or alternatively, the method also includes the second hearing device suppressing ambient noise in an environment of the second user to improve audibility of the second output signal. The method may include the second hearing device reducing volume on an existing incoming audio stream to improve audibility of the second output signal, in some examples. In various examples, the method includes the first hearing device using machine learning to detect the first acoustic own voice signal and to suppress non-speech sounds. The method may include the second hearing device detecting a position of the first user to obtain a direction of incoming communication and providing a directional component to the second output signal for the second user based on the direction of incoming communication, in an embodiment. In various examples, the method includes the second hearing device receiving via the wireless connection a third audio packet from a third hearing device of a third user, mixing the first audio packet and the third audio packet, and playing a third output signal for the second user based on the mixing. Various types of wireless connections may be used, including but not limited to Bluetooth® (such as Bluetooth® 5.2, for example) or Bluetooth® Low Energy (BLE) connections. Additionally or alternatively, the wireless connection provides for use of isochronous channels. For example, Bluetooth® 5.2 permits one device to stream to multiple devices over isochronous channels.

Figure 4:
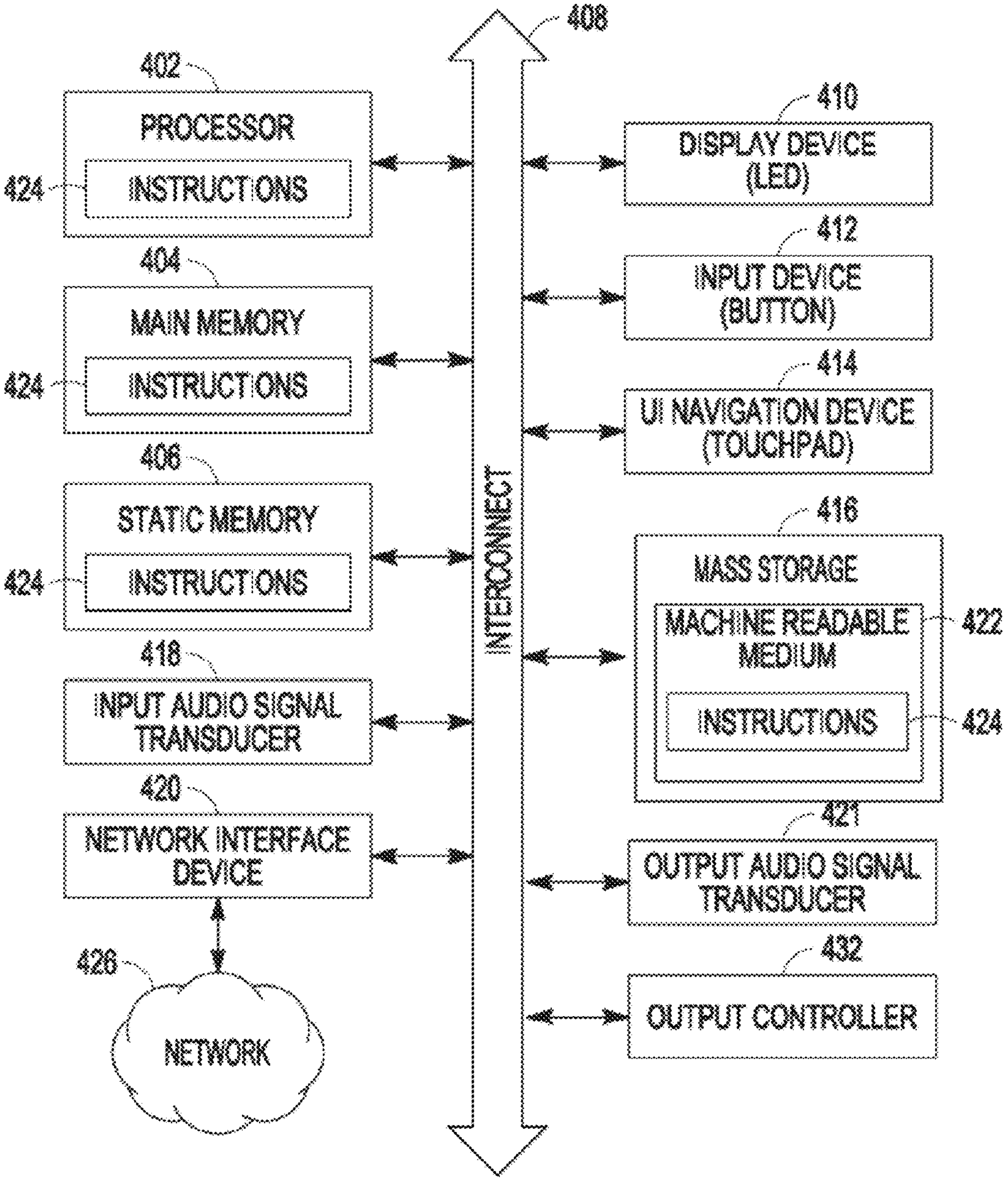
FIG. 4 illustrates a block diagram of an example machine upon which any one or more of the techniques discussed herein may perform.

FIG. 4 illustrates a block diagram of an example machine 400 upon which any one or more of the techniques (e.g., methodologies) discussed herein may perform. In alternative examples, the machine 400 may operate as a standalone device or may be connected (e.g., networked) to other machines. In a networked deployment, the machine 400 may operate in the capacity of a server machine, a client machine, or both in server-client network environments. In an example, the machine 400 may act as a peer machine in peer-to-peer (P2P) (or other distributed) network environment. The machine 400 may be a personal computer (PC), a tablet PC, a set-top box (STB), a personal digital assistant (PDA), a mobile telephone, a hearing device, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 400 may include a hardware processor 402 (e.g., a central processing unit (CPU), a graphics processing unit (GPU), a hardware processor core, or any combination thereof), a main memory 404 and a static memory 406, some or all of which may communicate with each other via an interlink (e.g., bus) 408. The machine 400 may further include a display unit 410, an alphanumeric input device 412 (e.g., a keyboard), and a user interface (UI) navigation device 414 (e.g., a mouse). In an example, the display unit 410, input device 412 and UI navigation device 414 may be a touch screen display. The machine 400 may additionally include a storage device (e.g., drive unit) 416, one or more input audio signal transducers 418 (e.g., microphone), a network interface device 420, and one or more output audio signal transducer 421 (e.g., speaker). The machine 400 may include an output controller 432, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 416 may include a machine readable medium 422 on which is stored one or more sets of data structures or instructions 424 (e.g., software) embodying or utilized by any one or more of the techniques or functions described herein. The instructions 424 may also reside, completely or at least partially, within the main memory 404, within static memory 406, or within the hardware processor 402 during execution thereof by the machine 400. In an example, one or any combination of the hardware processor 402, the main memory 404, the static memory 406, or the storage device 416 may constitute machine readable media.

While the machine readable medium 422 is illustrated as a single medium, the term "machine readable medium" may include a single medium or multiple media (e.g., a centralized or distributed database, and/or associated caches and servers) configured to store the one or more instructions 424.

The term "machine readable medium" may include any medium that is capable of storing, encoding, or carrying instructions for execution by the machine 400 and that cause the machine 400 to perform any one or more of the techniques of the present disclosure, or that is capable of storing, encoding or carrying data structures used by or associated with such instructions. Non-limiting machine-readable medium examples may include solid-state memories, and optical and magnetic media. In an example, a massed machine-readable medium comprises a machine-readable medium with a plurality of particles having invariant (e.g., rest) mass. Accordingly, massed machine-readable media are not transitory propagating signals. Specific examples of massed machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 424 may further be transmitted or received over a communications network 426 using a transmission medium via the network interface device 420 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 420 may include one or more physical jacks (e.g., Ethernet, coaxial, or phone jacks) or more antennas to connect to the communications network 426. In an example, the network interface device 420 may include a plurality of antennas to communicate wirelessly using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 400, and includes digital or analog communications signals or other intangible medium to facilitate communication of such software.

Various examples of the present subject matter support wireless communications with a hearing device. In various examples the wireless communications may include standard or nonstandard communications. Some examples of standard wireless communications include link protocols including, but not limited to, Bluetooth™, Bluetooth™ Low Energy (BLE), IEEE 802.11 (wireless LANs), 802.15 (WPANs), 802.16 (WiMAX), cellular protocols including, but not limited to CDMA and GSM, ZigBee, and ultra-wideband (UWB) technologies. Such protocols support radio frequency communications and some support infrared communications while others support NFMI. Although the present system is demonstrated as a radio system, it is possible that other forms of wireless communications may be used such as ultrasonic, optical, infrared, and others. It is understood that the standards which may be used include past and present standards. It is also contemplated that future versions of these standards and new future standards may be employed without departing from the scope of the present subject matter.

The wireless communications support a connection from other devices. Such connections include, but are not limited to, one or more mono or stereo connections or digital connections having link protocols including, but not limited to 802.3 (Ethernet), 802.4, 802.5, USB, SPI, PCM, ATM, Fibre-channel, Firewire or 1394, InfiniBand, or a native streaming interface. In various examples, such connections include all past and present link protocols. It is also contemplated that future versions of these protocols and new future standards may be employed without departing from the scope of the present subject matter.

Hearing assistance devices typically include at least one enclosure or housing, a microphone, hearing assistance device electronics including processing electronics, and a speaker or "receiver." Hearing assistance devices may include a power source, such as a battery. In various examples, the battery is rechargeable. In various examples multiple energy sources are employed. It is understood that in various examples the microphone is optional. It is understood that in various examples the receiver is optional. It is understood that variations in communications protocols, antenna configurations, and combinations of components may be employed without departing from the scope of the present subject matter. Antenna configurations may vary and may be included within an enclosure for the electronics or be external to an enclosure for the electronics. Thus, the examples set forth herein are intended to be demonstrative and not a limiting or exhaustive depiction of variations.

It is understood that digital hearing assistance devices include a processor. In digital hearing assistance devices with a processor, programmable gains may be employed to adjust the hearing assistance device output to a wearer's particular hearing impairment. The processor may be a digital signal processor (DSP), microprocessor, microcontroller, other digital logic, or combinations thereof. The processing may be done by a single processor, or may be distributed over different devices. The processing of signals referenced in this application may be performed using the processor or over different devices. Processing may be done in the digital domain, the analog domain, or combinations thereof. Processing may be done using subband processing techniques. Processing may be done using frequency domain or time domain approaches. Some processing may involve both frequency and time domain aspects. For brevity, in some examples drawings may omit certain blocks that perform frequency synthesis, frequency analysis, analog-to-digital conversion, digital-to-analog conversion, amplification, buffering, and certain types of filtering and processing. In various examples of the present subject matter the processor is adapted to perform instructions stored in one or more memories, which may or may not be explicitly shown. Various types of memory may be used, including volatile and nonvolatile forms of memory. In various examples, the processor or other processing devices execute instructions to perform a number of signal processing tasks. Such examples may include analog components in communication with the processor to perform signal processing tasks, such as sound reception by a microphone, or playing of sound using a receiver (i.e., in applications where such transducers are used). In various examples of the present subject matter, different realizations of the block diagrams, circuits, and processes set forth herein may be created by one of skill in the art without departing from the scope of the present subject matter.

It is further understood that different hearing devices may embody the present subject matter without departing from the scope of the present disclosure. The devices depicted in the figures are intended to demonstrate the subject matter, but not necessarily in a limited, exhaustive, or exclusive sense. It is also understood that the present subject matter may be used with a device designed for use in the right ear or the left ear or both ears of the wearer.

The present subject matter is demonstrated for hearing devices, including hearing assistance devices, including but not limited to, behind-the-ear (BTE), in-the-ear (ITE), in-the-canal (ITC), receiver-in-canal (RIC), invisible-in-canal (IIC) or completely-in-the-canal (CIC) type hearing assistance devices. It is understood that behind-the-ear type hearing assistance devices may include devices that reside substantially behind the ear or over the ear. Such devices may include hearing assistance devices with receivers associated with the electronics portion of the behind-the-ear device, or hearing assistance devices of the type having receivers in the ear canal of the user, including but not limited to receiver-in-canal (RIC) or receiver-in-the-ear (RITE) designs. The present subject matter may also be used in hearing assistance devices generally, such as cochlear implant type hearing devices. The present subject matter may also be used in deep insertion devices having a transducer, such as a receiver or microphone. The present subject matter may be used in bone conduction hearing devices, in some examples. The present subject matter may be used in devices whether such devices are standard or custom fit and whether they provide an open or an occlusive design. It is understood that other hearing devices not expressly stated herein may be used in conjunction with the present subject matter.

This application is intended to cover adaptations or variations of the present subject matter. It is to be understood that the above description is intended to be illustrative, and not restrictive. The scope of the present subject matter should be determined with reference to the appended claims, along with the full scope of legal equivalents to which such claims are entitled.

What is claimed is:

1. A system, comprising:

one or more first hearing devices configured to be worn on or in an ear of a first user; and one or more second hearing devices configured to be worn on or in an ear of a second user, wherein the one or more first hearing devices include one or more first processors programmed to:

receive a first acoustic own voice signal from the first user using a first in-the-car inward-facing microphone;

transmit to the one or more second hearing devices via a wireless connection a first audio packet based on the received first acoustic own voice signal;

receive a second audio packet from the one or more second hearing devices via the wireless connection; and play a first output signal for the first user based on the second audio packet, and wherein the one or more second hearing devices include one or more second processors programmed to:

receive a second acoustic own voice signal from the second user using a second in-the-ear inward-facing microphone;

transmit to the one or more first hearing devices via the wireless connection the second audio packet based on the received second acoustic own voice signal;

receive the first audio packet from the one or more first hearing devices via the wireless connection; and play a second output signal for the second user based on the first audio packet.

2. The system of claim 1, wherein the wireless connection includes a Bluetooth® connection.

3. The system of claim 1, wherein the wireless connection includes a Bluetooth® Low Energy (BLE) connection.

4. The system of claim 1, wherein at least one of the one or more first hearing devices or the one or more second hearing devices includes a control button on a surface of a device housing.

5. The system of claim 4, wherein the control button is configured to be pressed to pair or unpair the one or more first hearing devices and the one or more second hearing devices.

6. The system of claim 1, wherein at least one of the one or more first hearing devices or the one or more second hearing devices includes a connection to a smartphone application.

7. The system of claim 6, wherein the smartphone application is configured to be used to pair or unpair the one or more first hearing devices and the one or more second hearing devices.

8. The system of claim 1, wherein at least one of the one or more first hearing devices or the one or more second hearing devices includes a voice control configured to be used to pair or unpair the one or more first hearing devices and the one or more second hearing devices.

9. The system of claim 1, wherein the one or more first hearing devices and the one or more second hearing devices are configured to share audio information to enhance performance of one or more of speech intelligibility or noise reduction.

10. The system of claim 1, wherein at least one of the one or more first hearing devices or the one or more second hearing devices is a hearing assistance device.

11. The system of claim 10, wherein the hearing assistance device is a hearing aid.

12. A method, comprising:

receiving, using an in-the-ear inward-facing microphone of a first hearing device configured to be worn on or in an ear of a first user, a first acoustic own voice signal from the first user;

transmitting, from the first hearing device via a wireless connection to a second hearing device configured to be worn on or in an ear of a second user, a first audio packet based on the received first acoustic own voice signal;

receiving, at the second hearing device via the wireless connection, the first audio packet from the first hearing device; and playing, at the second hearing device using a second receiver, a second output signal for the second user based on the first audio packet.

13. The method of claim 12, further comprising:

receiving, using a second microphone of the second hearing device, a second acoustic own voice signal from the second user;

transmitting, from the second hearing device via the wireless connection to the first hearing device, a second audio packet based on the received second acoustic own voice signal;

receiving, at the first hearing device via the wireless connection, the second audio packet from the second hearing device; and playing, at the first hearing device using a first receiver, a first output signal for the first user based on the second audio packet.

14. The method of claim 12, further comprising:

suppressing, by the second hearing device, ambient noise in an environment of the second user to improve audibility of the second output signal.

15. The method of claim 12, further comprising:

reducing, by the second hearing device, volume on an existing incoming audio stream to improve audibility of the second output signal.

16. The method of claim 12, further comprising:

using, by the first hearing device, machine learning to detect the first acoustic own voice signal and to suppress non-speech sounds.

17. The method of claim 12, further comprising:

detecting, by the second hearing device, a position of the first user to obtain a direction of incoming communication; and providing, by the second hearing device, a directional component to the second output signal for the second user based on the direction of incoming communication.

18. The method of claim 12, further comprising:

receiving, at the second hearing device via the wireless connection, a third audio packet from a third hearing device of a third user;

mixing, at the second hearing device, the first audio packet and the third audio packet; and playing, at the second hearing device using the second receiver, a third output signal for the second user based on the mixing.

19. The method of claim 12, wherein the wireless connection includes a Bluetooth® connection.

20. The method of claim 12, wherein the wireless connection includes a Bluetooth® Low Energy (BLE) connection.

* * * * *